(12) United States Patent
Hernández

(10) Patent No.: US 10,385,252 B2
(45) Date of Patent: Aug. 20, 2019

(54) METHOD FOR FORMING A HIGH-PERFORMANCE AQUEOUS-PHASE POLYMER FLUID AND SYSTEM FOR DRILLING WELL BORES IN LOW-GRADIENT FORMATIONS

(71) Applicant: TECNOLOGÍA INTEGRAL EN FLUIDOS DE PERFORACIÓN S.A. DE C.V., Camen, Campeche (MX)

(72) Inventor: Carlos Ferrusquia Hernández, Distrito federal (MX)

( * ) Notice: Subject to any disclaimer, the term of this patent is extended or adjusted under 35 U.S.C. 154(b) by 0 days.

(21) Appl. No.: 15/509,465

(22) PCT Filed: Sep. 8, 2015

(86) PCT No.: PCT/MX2015/000125
§ 371 (c)(1),
(2) Date: Mar. 7, 2017

(87) PCT Pub. No.: WO2016/039612
PCT Pub. Date: Mar. 17, 2016

(65) Prior Publication Data
US 2017/0260439 A1    Sep. 14, 2017

(30) Foreign Application Priority Data
Sep. 8, 2014   (MX) ................... MX/A/2014/010735

(51) Int. Cl.
| | |
|---|---|
| *C09K 8/035* | (2006.01) |
| *C09K 8/08* | (2006.01) |
| *E21B 21/06* | (2006.01) |
| *C09K 8/06* | (2006.01) |

(52) U.S. Cl.
CPC .............. *C09K 8/08* (2013.01); *C09K 8/035* (2013.01); *C09K 8/06* (2013.01); *E21B 21/062* (2013.01); *E21B 21/068* (2013.01); *C09K 2208/12* (2013.01); *C09K 2208/32* (2013.01)

(58) Field of Classification Search
CPC ............................ C09K 3/00; C09K 3/1009; C09K 2200/0625; C09K 2208/12; C09K 2208/28; C09K 2208/32; C09K 8/035; C09K 8/08; C09K 8/68; C09K 8/88; E21B 21/062; E21B 21/068; E21B 43/26
See application file for complete search history.

(56) References Cited

U.S. PATENT DOCUMENTS

| | | | | | |
|---|---|---|---|---|---|
| 3,766,986 | A | * | 10/1973 | Kiel | .......... C09K 8/64 166/283 |
| 2004/0016572 | A1 | * | 1/2004 | Wylie | ..................... E21B 21/06 175/66 |
| 2009/0023614 | A1 | * | 1/2009 | Sullivan | ................... C09K 8/68 507/214 |
| 2011/0220354 | A1 | * | 9/2011 | Eikaas | .................. B01F 3/1271 166/275 |

FOREIGN PATENT DOCUMENTS

| | | | |
|---|---|---|---|
| MX | 2011/002934 | * | 12/2011 |
| MX | 2011002934 | | 12/2011 |

* cited by examiner

*Primary Examiner* — Kumar R Bhushan
(74) *Attorney, Agent, or Firm* — James R. McDaniel

(57) ABSTRACT

The present invention relates to a method to form or obtain a high performance aqueous phase polymer fluid, which is a seawater-based drilling fluid for well drilling in low gradient formations. It is formulated based on liquid state polymer chemical products, easy to aggregate, and quickly mixed; a preparation and homogenization process that reduces preparation times, designed to drill hydrocarbon-producing deposits, focusing on minimizing damages to the producing formations, with a high rate of circulation loss in naturally fractured deposits. The system is environmentally-friendly, it complies with the main functions required of drilling fluids, while also providing a high inhibition control by swelling and dispersion of clay zones, due to the polymeric nature of the materials with which it is formulated. It is a fluid that does not contain solids in its formulation and provides an excellent transport and cleaning of drilling shears in the well.

11 Claims, 10 Drawing Sheets

METHOD FOR FORMING A HIGH-PERFORMANCE AQUEOUS-PHASE POLYMER FLUID AND SYSTEM FOR DRILLING WELL BORES IN LOW-GRADIENT FORMATIONS

TECHNICAL FIELD OF THE INVENTION

The process of the present invention describes aqueous based polymer fluids used in drilling low gradient formations for oil and geothermal wells.

BACKGROUND OF THE INVENTION

During the drilling of hydrocarbon-producing wells, several layers of the Earth's crust are drilled in order to reach the depths where these oil and gas deposits are located; these extracts are several geological layers, which have different characteristics as far as rock composition, pressures, and temperatures go. To achieve this purpose, drilling fluids are used. The drilling of wells is performed in both terrestrial and maritime locations and the selection and design of the fluids must be carried out so as to avoid problems and operational risks, lower operating costs, shorten drilling time, and increase the production of hydrocarbons.

Formations of dolomitized and fractured carbonates of the Upper Jurassic Kimmieridgian-Thithonian, the carbonate breccia from the Lower Paleocene and Upper Cretaceous, and the carbonated sands of the Middle Eocene are found when drilling is conducted in the Ku Maloob Zapp and Cantarell Production Facilities fields. These types of rocks have a stratigraphic-structural trap. Similarly, the Cantarell, Sihil, EK-Balam, Kuil, Homol and Onel fields deposits consist of fractured limestones of vugular porosity from the Breccia-Paleocene-Upper Cretaceous age, at an average depth of 3600-4800 vertical meters, hindering its normal drilling during well construction at the breccia stage (BT-PKS).

In this field, wells are traditionally built by means of a 36" drill bit using sea water to a drilling depth of 210 meters deep (md). Next, a 30" lining pipe (LP) is settled. The next stage uses a 17½" drill bit with a "Bentonite" water-based fluid to 1000 md and a 13⅜" LP is inserted. The next stage is drilled with 12¼" drill bit and inverse emulsion (I.E.) mud with a density of 1.48-2.01 g/cc down to the Upper Paleocene layer (±/−4600 md) and LP is set between 100 to 150 md above the estimated depth for safety purposes and to avoid loss of total circulation, which would cause a series of operational problems at the beginning of the next stage, such as low rate of penetration (ROP), stuck pipes, etc. Drilling then proceeds using an 8½" drill bit, forming an angle up to 30°, to 4800 md (4700 mv) in the Lower Cretaceous formation. In most cases a low-density (L.D) fluid of 0.92 g/cc is used with expected with total circulation loss (quantified cases of up to 23,000 m³ lost, diesel-based low-density fluid).

The application of a high performance aqueous-phase polymer fluid formed by the method of the present invention, for the fifth step or 6½" step, due to the nature of the naturally-fractured deposit, is drilled with total circulation loss in maritime locations. To drill in these locations, oil- or water-based fluid systems are currently used, which require expensive logistics and the use of mud vessels to transport extensive contents of drilling water and diesel. For these wells, drilling operations are conducted pumping drilling fluid during 24 hours, and the water and diesel supplies are totally consumed, causing the interruption of drilling operations and the suspension of operations in drilling rigs more than 80 kilometers offshore due to insufficient water or diesel. The availability of supplies for fluid preparation and maintenance must be considered for the purpose of reducing transport costs and waiting times for the supply of such additives. Due to high operation costs generated daily by total circulation losses during breccia perforation (8½" and 6½" steps), as well as different operational problems, such as pipe entrapment and sticking because of the suspension of shears and clay instability, the selection of appropriate fluid systems for drilling operations is critical and requires a better and innovative design.

For well drilling in the Ku Maloob Zaap and Cantarell fields, the method and application of the high performance aqueous-phase polymer fluid technology were used in the breccia area, with high-performance polymer products, mainly liquid, easy and quick to mix, that guarantee the necessary technical parameters demanded, such as suspension capacity, the carrying of shears to the breccia zone, filtrate control, inhibition of the clay formations such as the lutitic collars of the Upper Jurassic, thermal stability, and resistance to contamination such as anhydrite and $CO_2$, among others that delay the operations caused by the lack of fluid during the total circulation losses.

In the current market, there are companies that apply fluids; for example, the MI Company, which has a system called BAMIL to drill in loss zones, comprised of (3) liquid products and that in its preparation manages to obtain up to 35 seconds of viscosity with a 4:00 hour preparation time for every 70 m³, and inhibition limitations up to 18 CEC. The products have degradation and precipitation on the very low-lubricity liquid Xanthan Gum.

The QMAX Company has a system called QBAM, comprised of 8 chemical products, 5 of which are in powder form and 3 in liquid form, which significantly affects the time it takes for fluid preparation: 4:30 hours for every 70 m3. FIG. 5, presenting clots of polymer in the system and inhibition limitations up to 18 CEC.

Furthermore, the Global Drilling Fluids Company has a system comprising 8 products, 5 of which are in a powder form and 3 in a liquid form; a pre-treatment has to be applied to the seawater, and during preparation, clots are formed in the fluid, which must be stirred longer preparing in 4:50 minutes for every 70 m³, with inhibition of up to 20 CEC.

In current systems, the presence of Xanthan Gum clots when preparing the fluid directly affects their performance and that of the circulation system, since the clots, also called "fish eyes", may cover the strainers of fluid pumps, drilling tubing, and down-hole drilling motors; therefore, it could be expected that the mix will be finished evenly, thus substantially increasing the fluid preparation times.

Some of the problems that most affect drilling with the use of these systems are the following:
a) High preparation time, causing an intermittent drilling.
b) Great volumes of raw materials, FIG. 1(A), causing pending suspension of materials.
c) insufficient inhibition in the system causing sticking of pipes.
d) Use of mud vessels, as support in the preparation and pumping.
e) Little progress in drilling due to low rheological properties (low viscosity).
f) Long drilling times.

The method of this invention is intended to eliminate the current aforementioned problems, achieve a reduction in the volumes to be consumed as a consequence of the improvement in the times once the drilling parameters have been improved by providing a very similar lubricity to the oil-based fluids and cleaning of the well, with no need to prepare cleaning sweeps, eliminating the use of supporting vessels for fluid preparation and pumping, and developing a continuous drilling.

Currently, there is no system prepared with so few components and that complies with the speed, preparation, inhibition, and lubricity requirements. Considering that well drilling is an activity more than 60 years old and a system that manages to achieve this activity has not been presented. The stage of the well where these kinds of fluids are usually used is programmed for an average of 20 m per day when 120 m per day are drilled with this system.

One of the objectives of the invention is to provide a method to form an aqueous-phase polymer fluid with certain chemical components interacting in a stable way to overcome the current technical problems in well drilling.

Another objective of the invention is to provide a system to form an aqueous-phase polymer fluid with certain elements interacting to overcome the current technical problems in well drilling.

DESCRIPTION OF THE INVENTION

Brief Description of Figures

FIG. 11 is an example which illustrates the appearance of the high performance aqueous-phase polymer fluid dispersion obtained through the method of the present invention and the perforation shearing pill, Mix 6.

DETAILED DESCRIPTION OF THE INVENTION

Figure 5:
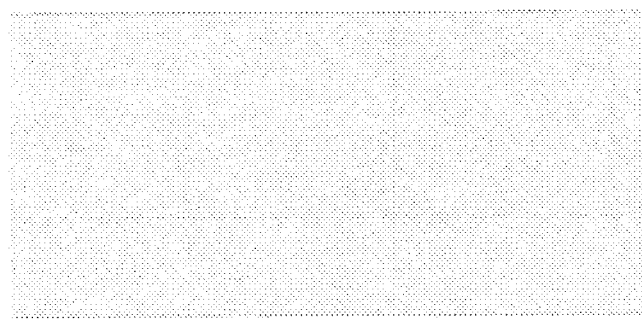
FIG. 5 is a graph representing the generation times in hours, of 70 $m^3$.
Figure 5:
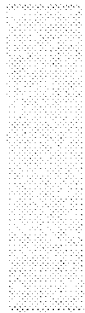

As per the presented figures, this invention refers to a method for obtaining a high-performance aqueous-phase polymer fluid for drilling wells in low gradient formations, consisting of preparing a significant volume (70 $m^3$) in the shortest time possible with rheological possibilities (Viscosity) as shown in the graph of FIG. 5.

Figure 1:
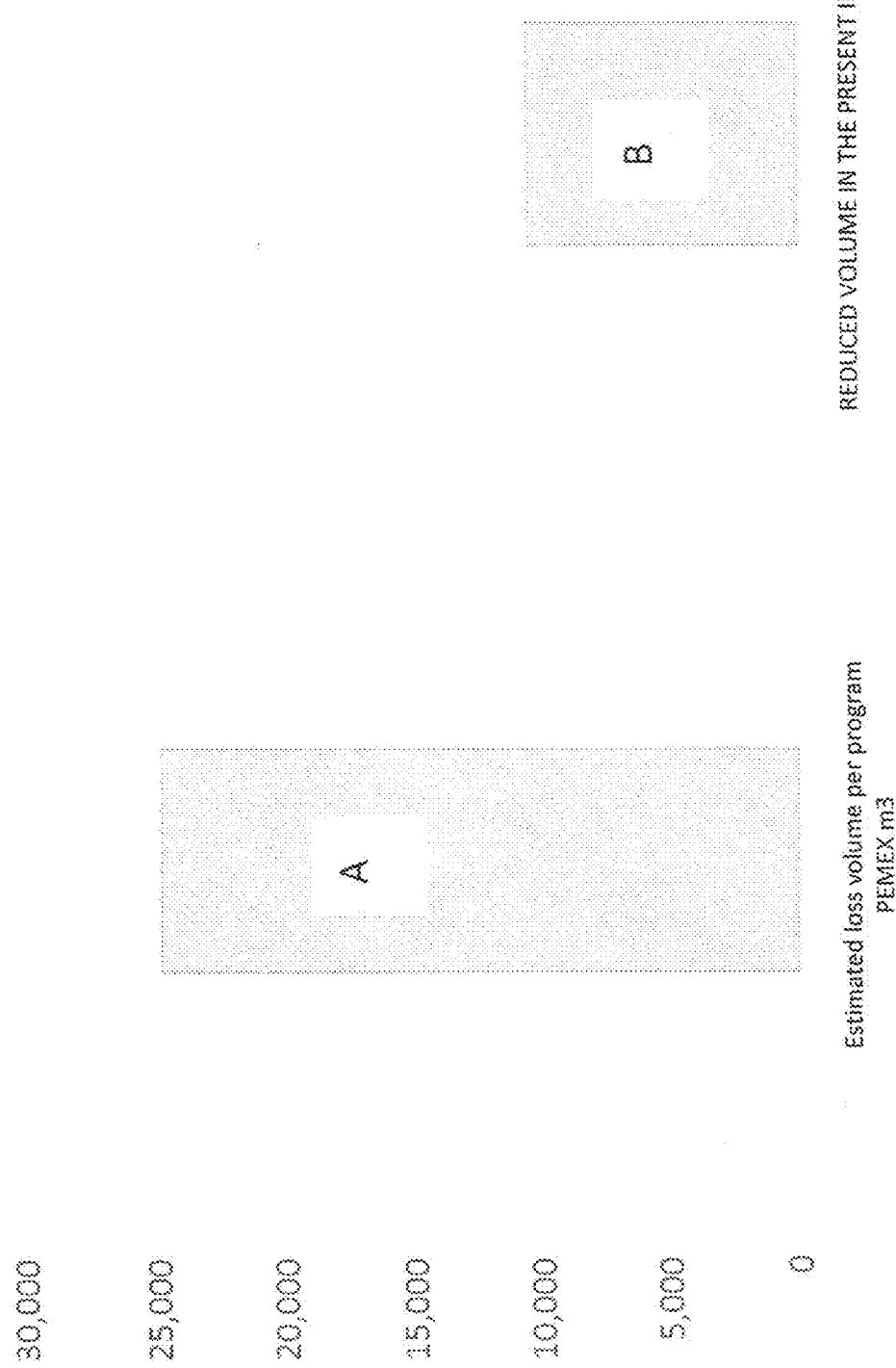
FIG. 1 is a graph representing the reduction of volume loss.

The reason the quantity is 70 $m^3$ or more is because, during drilling operations, 70 $m^3$ to 120 $m^3$ are pumped per hour, depending on the required volumes for drilling; this in order to achieve drilling without having to suspend it due to lack of materials or volume. A test of the reduced volume is shown in FIG. 1.

The elimination of polymer clots also known as "fish eyes" is a priority during the high performance aqueous-phase polymer fluid preparation, since during formation, one must wait until there is a complete incorporation of the polymer or products to the system in order to avoid pumping equipment damage and blockage of the strainers of directional tools. For this reason, the use of rapid wetting polymers is important in the reduction of preparation times.

When preparing a high performance aqueous-phase polymer fluid as quickly as in this method, longer stirring times are used often in order to ensure that homogenization and dilution of products has been adequate, and increasing preparation times; therefore, in the method of this invention, a clay inhibitor easily incorporated to the system is used thereby achieving the stirring for 5 minutes at the end of water and last product aggregation (time adjustment to a total of half an hour), to be correctly inhibited.

Figure 7:
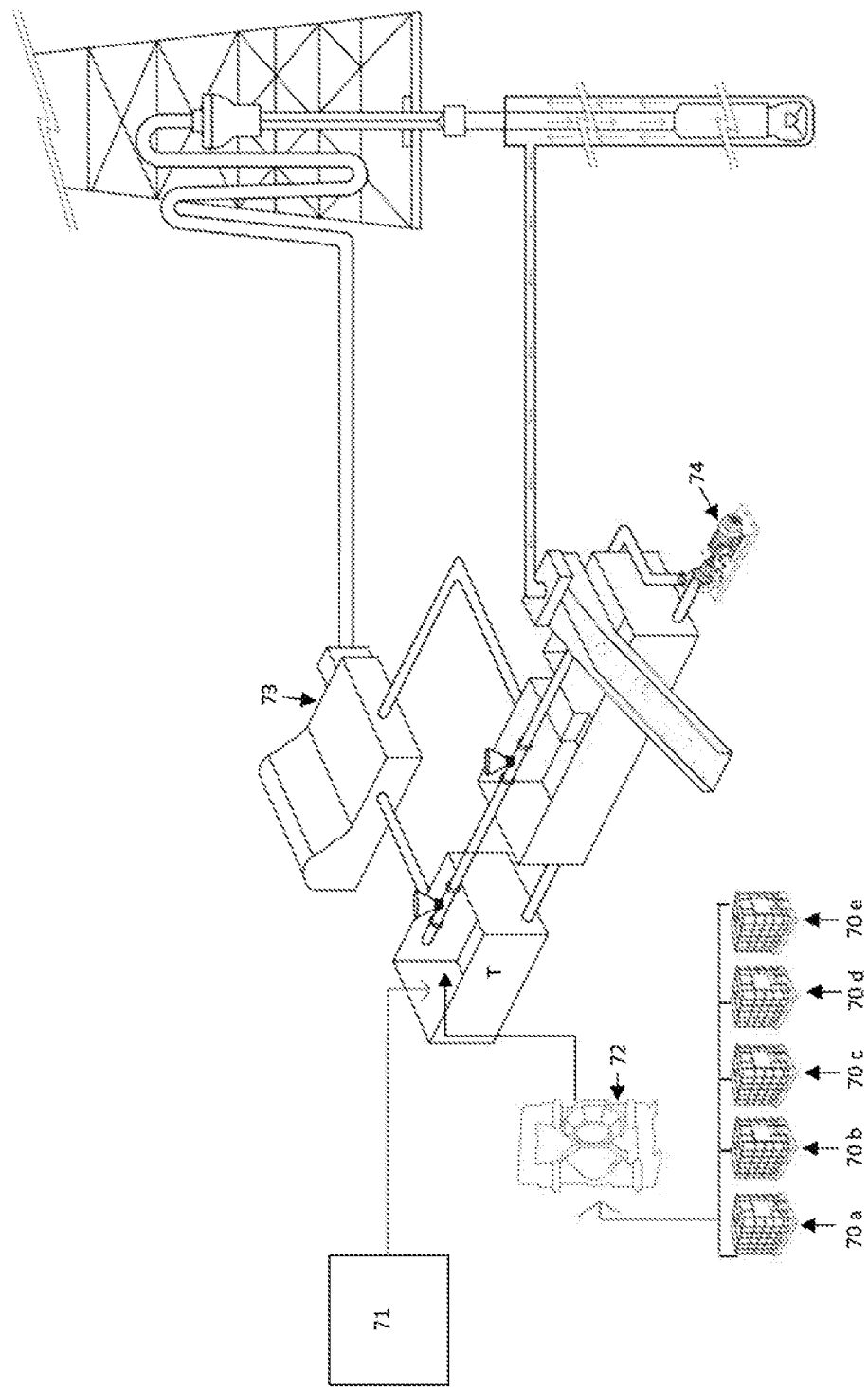
FIG. 7 is a condensed schematic chart of the method for the preparation of the high performance aqueous-phase polymer fluid.

Although all fluids must comply with different regulations of water-based fluids, this fluid, which is obtained by the process of this invention, is characterized by being manufactured with few materials (five products), that in this case are liquid products and that have been evaluated to have electrochemical affinity when mixing that allows a uniform and quick mixture preparation while also complying with the inhibition, viscosity, lubricity, and rheology requirements, FIG. 7.

During customer validation of drilling fluids, the established requirements in the rock fluid interaction must be complied with, in this interaction the system easily provides clay inhibitions up to 30 CEC, FIG. 7. In addition, unlike other systems, this physicochemical property can be easily given.

The method of the current invention needs to add, in certain stages and with certain operation characteristics, a number of chemical compounds that make up a high performance aqueous-phase polymer fluid for drilling of wells in low-gradient formations; therefore, the following table indicates such compounds, their role, as well as the mixing quantities:

| Chemical material | Concentration in $L/m^3$ |
|---|---|
| Seawater/continuous phase | 974.80-966.30 |
| Amine corrosion inhibitor | 1.80-2.50 |
| Amine glycol & KCl mixture inhibitor | 5.40-7.20 |
| Xanthan gum (viscosifier) | 8.10-10.80 |
| Polyanionic Cellulose Polymer (filtration reducer) | 7.20-9.60 |
| Polyacrylamide (clay stabilizer) | 2.70-3.60 |

Each of these components has the function of mixing easily in an established order, without reacting to each other and interacting with the available continuous phase (Aqueous), up to 100% of the continuous phase, in such a way that there is no free continuous phase interacting with the clays or formations without being previously inhibited during the moistening process of the other components.

Figure 2:
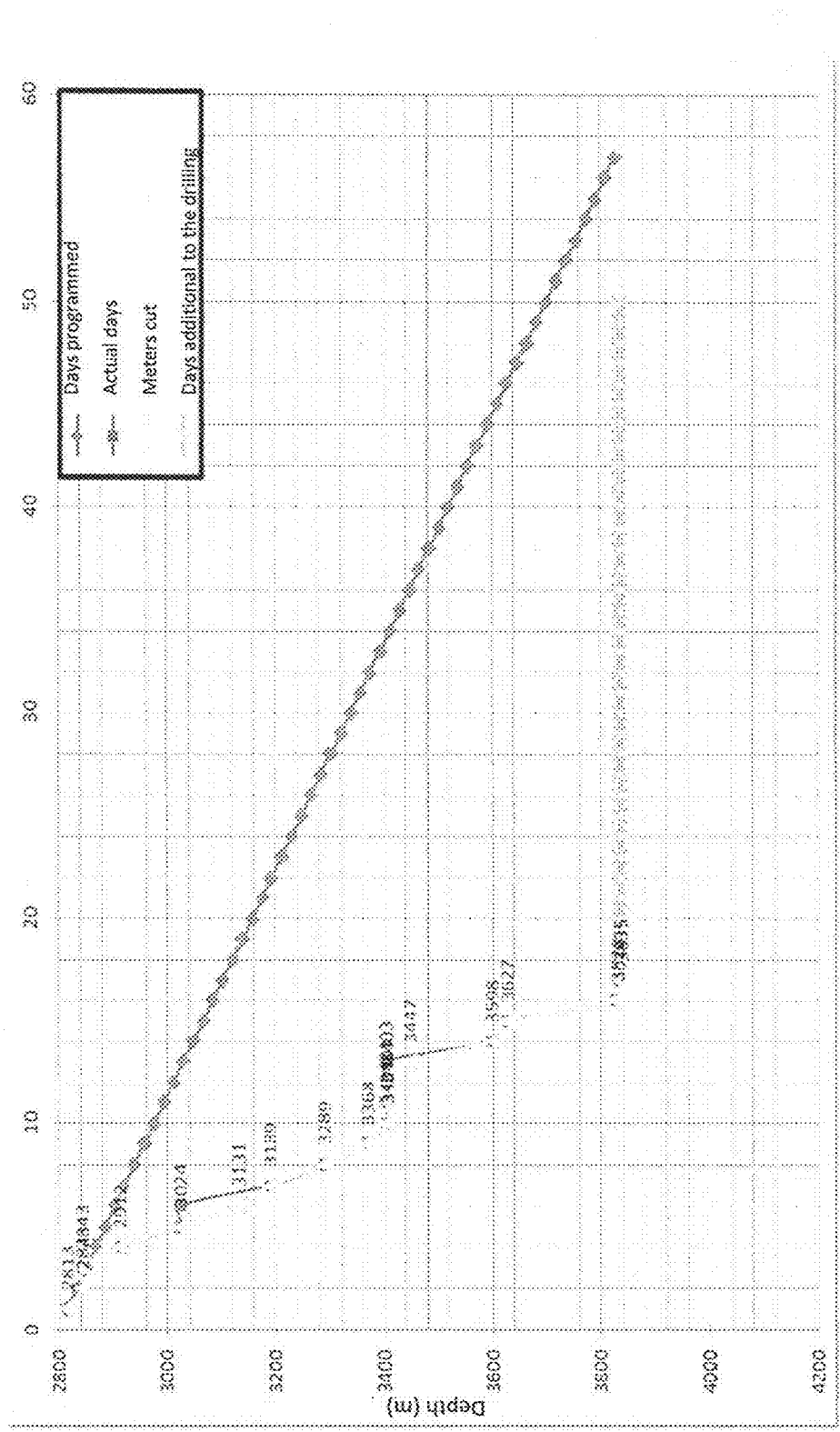
FIG. 2 is a graph representing the reduction in drilling times of the Cantarell 3017 well.
Figure 3:
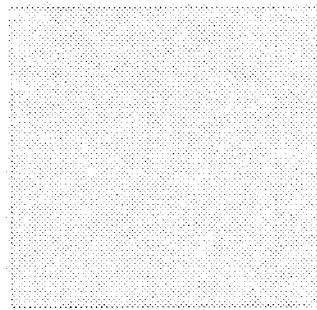
FIG. 3 is a graph representing the reduction of logistics on volume of materials to generate 10,000 $m^3$ (pcs. racks/tote).
Figure 3:
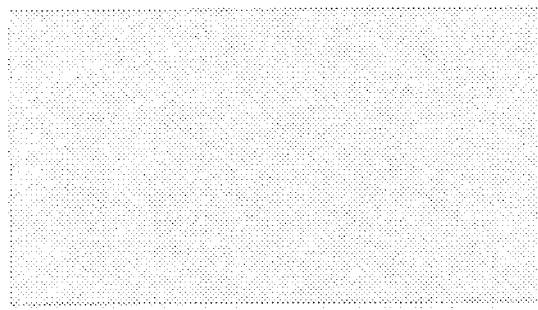
Figure 4:
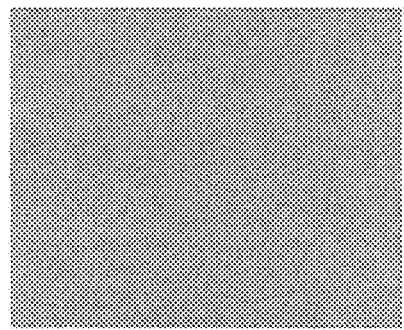
FIG. 4 is a graph representing the pre-treatment of seawater for drilling fluids preparation in hours.
Figure 6:
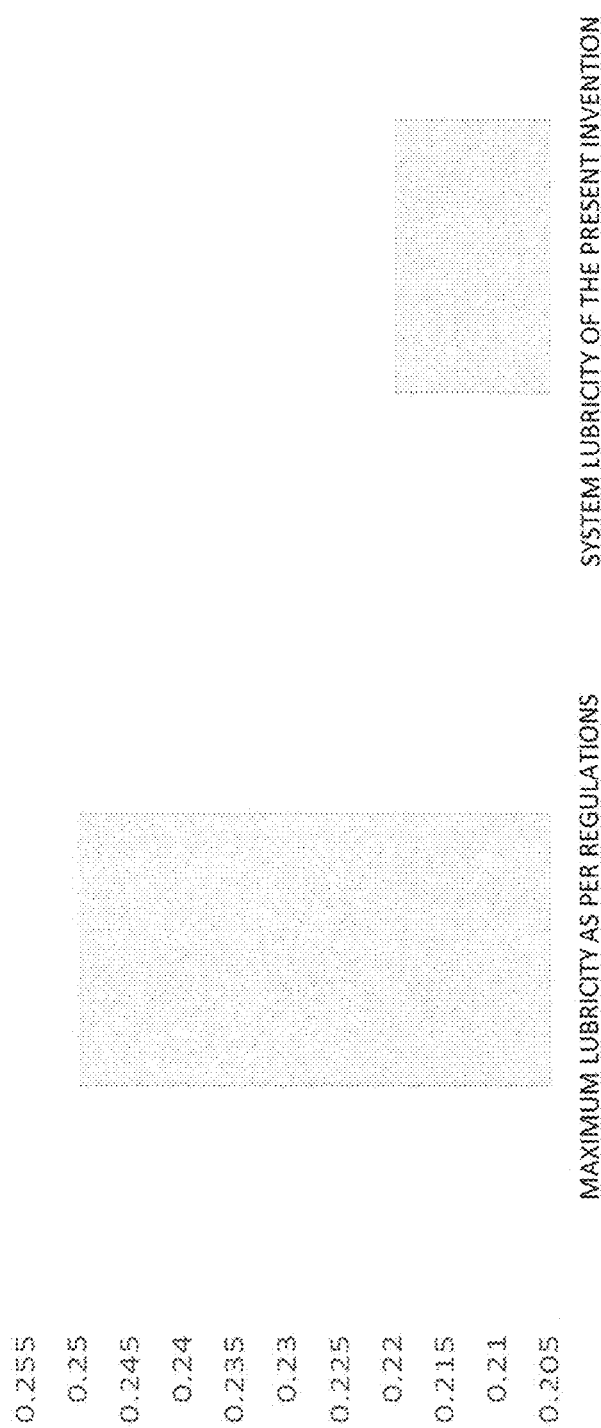
FIG. 6 is a graph representing the lubricity ratio: Standard NMX-L-167-SCFI-2004.

During the application of this aqueous-phase polymer fluid in the Cantarell-3017D well; It was demonstrated that the most important, novel and inventive differences in the method of the present invention were as follows:

a) The preparation time showed 70 $m^3$ can be manufactured in only 30 minutes as shown in FIG. 5 b) Reduction of consumed volume up to 50% regarding the volume consumed with other systems. FIG. 1.
c) Drilling time improved up to 77%, FIG. 2.
d) The use of support vessels to prepare and pump fluid was eliminated.
e) The logistic travels of vessels was reduced by 50%, as shown in FIG. 3.
f) The rate of penetration (ROP) was increased due to the high rheological Properties. FIG. 2.
g) For the preparation of viscous sweeps of 200 sec.: 5 m$^3$ in 5 minutes.
h) The pre-treatment time for seawater is eliminated, as shown in FIG. 4
i) Provides 0.22 lubricity, increasing ROP, as illustrated in FIG. 6
j) Improves the performance of directional motors.
k) Eliminates the generation of wastes in bags.
l) Well finished to gauge.

Preparation Method of Well Drilling Fluids

The high performance aqueous-phase polymer fluid preparation process must be formulated and designed to meet the requirements needed for well drilling. Before preparing the fluid, the mud dams must be cleaned. It is necessary to check the valves of non-communicated dams. More specifically, the following points should be taken into account:

1.—Resource preparation
2.—Resource mobilization
3.—System preparation
4.—System quality verification
5.—Field laboratory equipment
6.—Laboratory equipment with special tests Resource Preparation:

For large-scale system preparation, tank systems or conventional dams, as those in the drilling equipment, which meet the minimum requirements, are necessary;
a) Mixing dams of 45 m3 minimum capacity
b) 45 HP centrifuge pumps
c) 3 kpascal air compressor
d) 2 pumps with a pumping capacity of 275 gpm (Diaphragm or Variable speed pump).
e) Suction and exhaust hoses resistant to chemical products and hydrocarbon byproducts.
f) Heavy-duty bronze quick connections
g) Air hoses with connections 2.—Resource Mobilization Once verifying the resources on the checklist prior to operations, document submission to Pemex (shipment notices) must be conducted to complete the shipping to the required site.

3.—System Preparation

Preparation of drilling fluids. The preparation method of the high performance aqueous-phase polymer fluid must be formulated and designed to meet the requirements needed for well drilling. Before preparing the fluid, mud preparation tanks or dams must meet the following requirements:

They must be clean and free of the fluid residues mentioned above.
They must avoid the connection between dams by means of suction valves or chambers from the same building.
The preferred agitation system is electro-mechanical agitation by means of beaters and agitators of turbines.
Stirring must be uniform across the whole volume of the tank or dam; if available, use down-hole guns to streamline the homogeneous incorporation of polymers.

4.—System Quality Verification, as per the API RP 13B-1 Method.

The laboratory tests with samples of correlation well formations of the breccia from Ku, Maloob, Zaap, and Cantarell fields, and the high performance aqueous-phase polymer fluid formation are carried out evaluating the following parameters:

Fluid stability
Fluid density (glee)
Marsh viscosity (sec.)
API plastic viscosity.
API yield point.
Low-shear rate yield point (LSRYP).
0' gel
10' gel
API filtering.
Water and solids content (%).
Chemical analysis (mud alkalinity, filtrate alkalinity, salinity, calcium ions content)

Rock-Fluid Interaction Tests

In the event that a study on the behavior of the rock-fluid interaction is required, the tests stated in this section will be performed.

Figure 8:
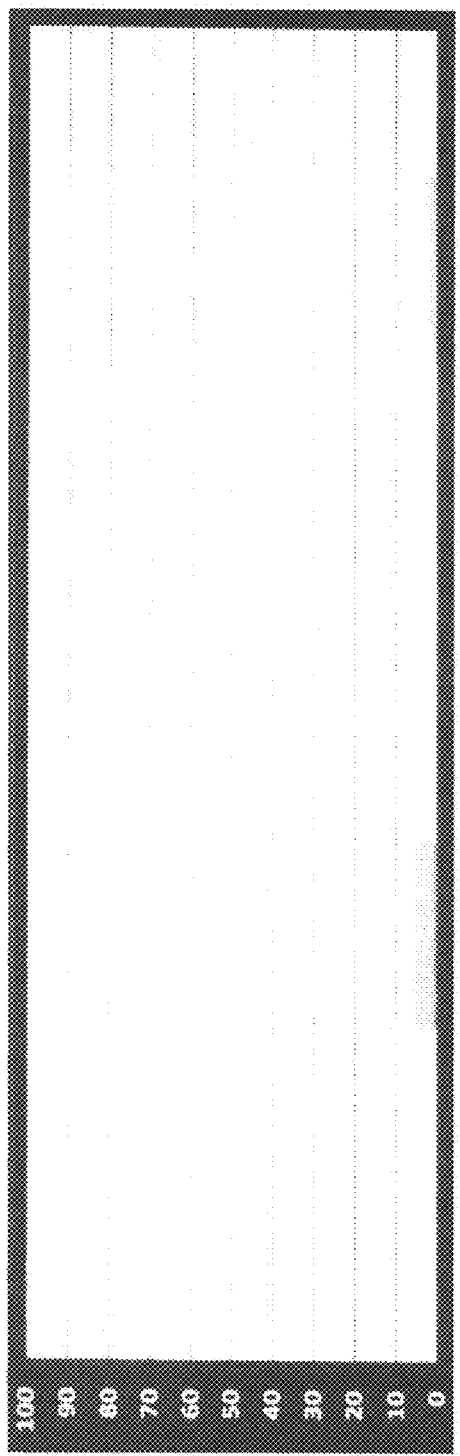
FIG. 8 is a graph representing the percentage of linear swelling of the high performance aqueous-phase polymer fluid with formation shears of the Cantarell BTPKS field.
Figure 9:
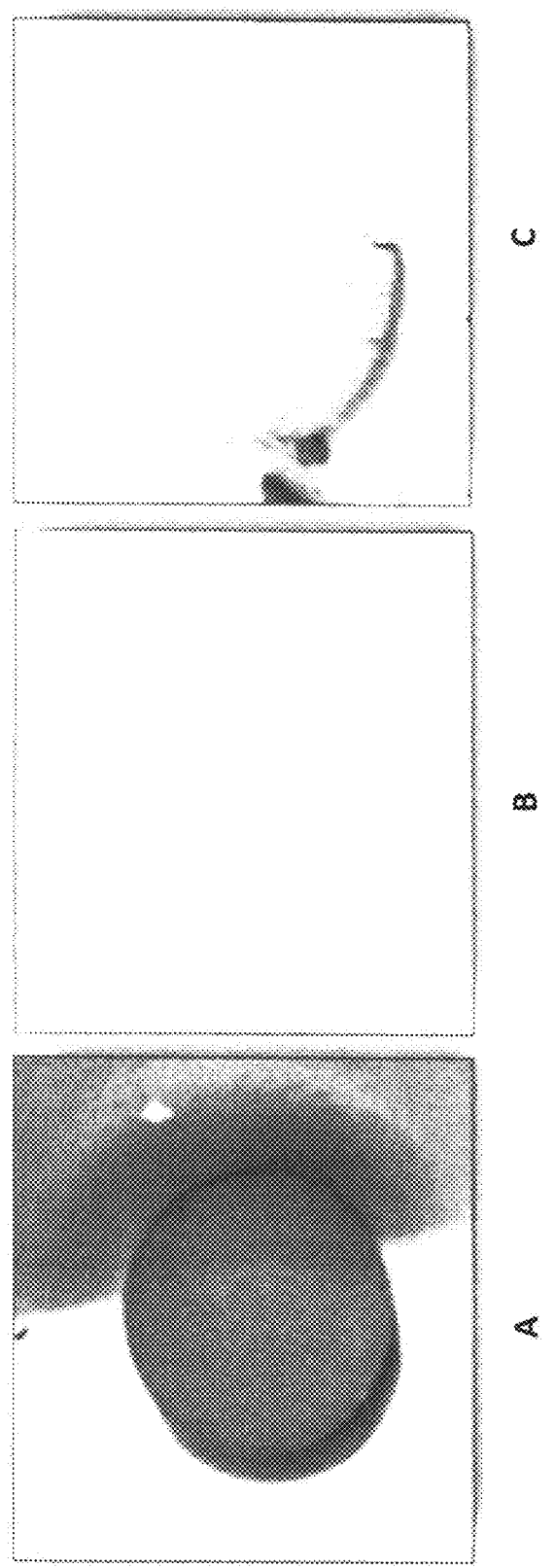
FIG. 9 is a graph representing the percentage of shear dispersion for Cantarell BTPKS flied formation.
Figure 10:
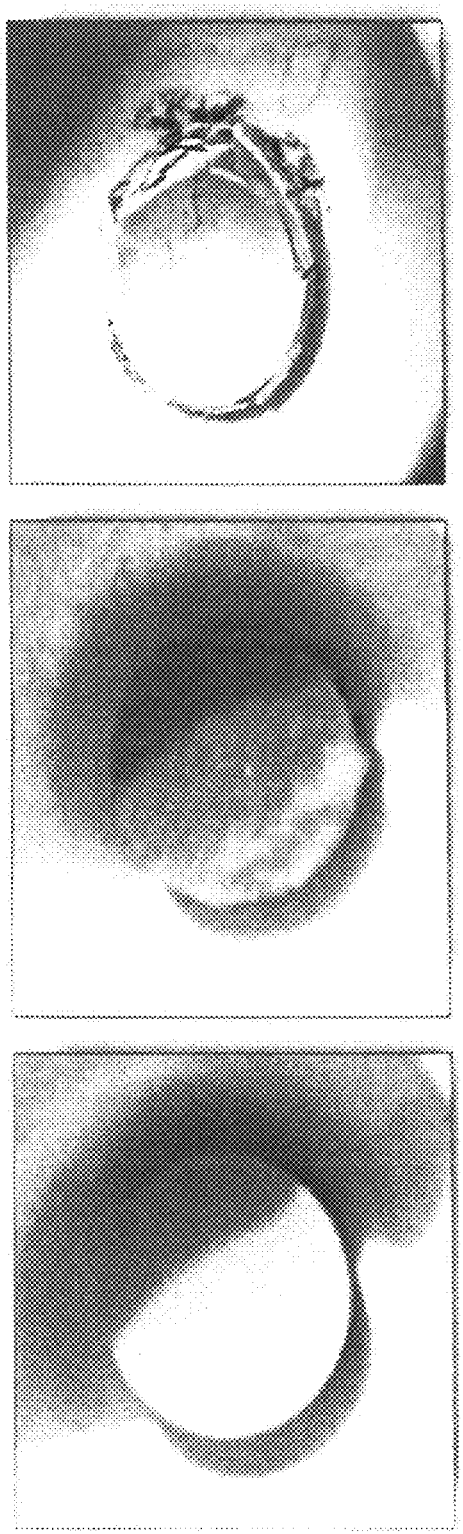
FIG. 10 is an example which illustrates the appearance of the high performance aqueous-phase polymer fluid dispersion obtained through the method of the present invention and the drilling shear pill, Mix 3.

These tests require shearings of formations, cores, or synthetic pills (A-C, A'-C'), of equal formation reactivity. The following interaction tests are performed with the preparation of the high performance aqueous-phase polymer fluid:

Linear swelling, as shown in FIG. 8.
Dispersion, as shown in FIG. 9.
CEC determination (Cationic Exchange Capacity in meq/100 g of day sample) of the clays used for the tests, see. FIGS. 10 and 11.

Thus, a preferred modality for the method of this invention in order to prepare a high performance aqueous-phase polymer liquid comprises the following stages:

a. Provide a dam or tank (T) with stirring system;
b. Provide a deep-well pump (71);
c. Provide a diaphragm pump (72) and suction and discharge hoses;
d. Provide a stabilizing container of clays (70a-70e);
e. Provide a container of filtration reducer (70a-70e);
f. Provide a container of glycol Amine mixture inhibitor (70a-70e);
g. Using the deep-well pump, add seawater to a selected dam or tank for the preparation up to 80% of its capacity, 974.80-966.30 liters/m$^3$, and employing the stirring system of the dams or tanks;
h. With the 3" diaphragm suction and discharge pump with pumping capacity of 237 gal/min, model PD30X-XXX-C, and hoses with a 3" diameter and 15 meters length, each hose reinforced with steel for managing a pressure of 250 psi with fast connections at the ends, located in the bomb suction and discharge, the products for the formulation of high performance aqueous-phase polymer fluid will be pumped into the dam or tank, where preparation tanks having 70 cm blade stirrers (4 blades total), with a 50-70 rpm torque and a 30 HP electrical motor will be continuously stirring the preparation tanks of the high performance aqueous-phase polymer liquid in their respective sites. Add a viscosifier as xanthan gum to reach a concentration of 8.10-10.80 liters/m$^3$;
i. Place the suction diaphragm pump in the clay stabilizer (Dispersion), and pump the product to reach a concentration of 2.70-3.60 liters/m$^3$, continue with system stirring;

j. Place the suction of the pump in the filtering reducer container, and pumping to achieve in a concentration of 7.20-9.60 liters/m³ and continue the stirring process;

k. With support of the diaphragm pump, continue with the addition of corrosion inhibitor up to a concentration of 1.80-2.50 liters/m³ and continue mixing the system;

l. Place the suction in the inhibitor mixture amine glycol and pump the clay inhibitor (Swelling), in a concentration of 5.40-7.20 liters/m³ and continue stirring the system;

m. If permitted by the operation, complete the 30-minute stirring time of system after adding all the material.

The continuous stirring time of the system is set to 30 minutes from the beginning of products pumping to have a homogeneous mixture of the high performance aqueous-phase polymer fluid, and pump the well with pump (73) of the equipment (e.g.: 6"×12" triplex pump, national oil Well®), to carry out the drilling operations. This method also involves a mixing pump (74).

The method to form a high performance aqueous-phase polymer fluid is designed to have the physicochemical properties necessary to carry out the drilling function, for which it is designed, since its preparation.

In addition, this invention provides a drilling system using a high performance aqueous-phase polymer fluid obtained from the inventive method, comprising: mixing channels of minimum capacity of 45 m3; centrifugal pumps of 45 HP; 3 kpascal air compressor; 2 pumps with pumping capacity of 275 gpm. (Diaphragm or Variable Speed Pump); suction and discharge hoses resistant to chemicals and hydrocarbon byproducts; Heavy-duty bronze connections and air hoses with connections.

Based on the above, it can be noted that, even though specific arrangements of the invention have been described in this document for illustrating purposes, several modifications can be made without diverting from the essence and scope of the invention. As a result, the invention has no limitations except the ones stated in the attached claims.

What is claimed is:

1. Method to form a high performance aqueous-phase polymer fluid, comprising the following steps:
   a) providing a dam or tank having a stirring system;
   b) providing a deep-well pump;
   c) providing a diaphragm pump having suction and discharge hoses;
   d) providing a day stabilizing container containing a day stabilizer;
   e) providing a filtration reducer container containing a filtration reducer;
   f) providing a glycol amine mixture inhibitor container containing a glycol amine mixture inhibitor;
   g) adding seawater by using the deep-well pump to the dam or tank, wherein the seawater is added to the dam or tank up to 80% of a capacity of the dam or tank, and employing the stirring system of the dam or tank;
   h) using the diaphragm pump to add a viscosifier to the dam or tank;
   i) placing the suction hose of the diaphragm pump in the day stabilizer container, and pumping the clay stabilizer from the clay stabilizer container into the dam or tank, while continuously stirring the mixture within the dam or tank;
   j) placing the suction hose of the diaphragm pump in the container of filtration reducer and pumping filtration reducer from the filtration reducer container into the dam or tank, while continuously stirring the mixture within the dam or tank;
   k) using the diaphragm pump to add a corrosion inhibitor into the dam or tank, while continuously stirring the mixture within the dam or tank;
   l) placing the suction hose of the diaphragm pump in the container of glycol amine mixture inhibitor and pumping the glycol amine mixture inhibitor from the glycol amine mixture inhibitor container into the dam or tank, while continuously stirring the mixture within the dam or tank; and
   m) stirring the mixture for 30-minute.

2. The method to form the high performance aqueous-phase polymer fluid, as claimed in claim 1, characterized in that in step g) seawater is added in the ratio of 974.80-966.30 liters/m³.

3. The method to form the high performance aqueous-phase polymer fluid, as claimed in claim 1, characterized in that in step h) the viscosifier is added until a concentration of 8.10-10.80 liters/m³ is reached.

4. The method to form the high performance aqueous-phase polymer fluid, as claimed in claim 1, characterized in that in step i) clay stabilizer is added until a concentration of 2.70-3.60 liters/m³ is reached.

5. The method to form the high performance aqueous-phase polymer fluid, as claimed in claim 1, characterized in that in step j) the filtration reducer is added until a concentration of 7.20-9.60 liters/m³ is reached.

6. The method to form the high performance aqueous-phase polymer fluid, as claimed in claim 1, characterized in that in step k) the corrosion inhibitor is added until a concentration of 1.80-2.50 liters/m³ is reached.

7. The method to form the high performance aqueous-phase polymer fluid, as claimed in claim 1, characterized in that in step l) the glycol amine mixture inhibitor is added until a concentration of 5.40-7.20 liters/m³ is reached.

8. The method to form the high performance aqueous-phase polymer fluid, as claimed in claim 1, characterized in that the wear of the deep-well pump may be between 600-800 liters/m³.

9. The method to form the high performance aqueous-phase polymer fluid, as claimed in claim 1, characterized in that the diaphragm pump in step h) has a 3" suction and discharge diameter with a 237 gal/min pump capacity, model PD30X-XXX-C, suction and discharge hoses with a diameter of 3" and length of 15 meters; each reinforced with steel to manage pressure of 250 psi, with fast connections in both ends, located in the suction and discharge pump.

10. The method to form the high performance aqueous-phase polymer fluid, as claimed in claim 1, characterized in that each preparation tank has 70 cm blade stirrers (4 blades total), with a torque of 50-70 rpm with 30 HP electric motor and which continually stir the preparation tanks for the high performance aqueous-phase polymer fluid positioned in their respective sites.

11. The method to form the high performance aqueous-phase polymer fluid, as claimed in claim 3, characterized in that after step m) the well is pumped by using a 6"×12" triplex pump to carry out the drilling work.

* * * * *